United States Patent [19]

Light et al.

[11] Patent Number: 4,578,437

[45] Date of Patent: Mar. 25, 1986

[54] COPOLYESTER/POLYESTER BLENDS HAVING REDUCED CARBON DIOXIDE PERMEABILITY

[75] Inventors: Ronald R. Light; Robert W. Seymour, both of Kingsport, Tenn.

[73] Assignee: Eastman Kodak Company, Rochester, N.Y.

[21] Appl. No.: 662,643

[22] Filed: Oct. 19, 1984

Related U.S. Application Data

[63] Continuation-in-part of Ser. No. 519,475, Aug. 1, 1983, abandoned.

[51] Int. Cl.$^4$ ............................................... C08L 67/02
[52] U.S. Cl. ...................................... 525/444; 524/539
[58] Field of Search .......................................... 525/444

[56] References Cited

U.S. PATENT DOCUMENTS

| | | | |
|---|---|---|---|
| 3,651,172 | 3/1972 | Barkey | 525/444 |
| 4,098,769 | 7/1978 | Go | 528/99 |
| 4,145,517 | 3/1979 | Go | 528/173 |
| 4,403,090 | 8/1983 | Smith | 528/272 |
| 4,482,586 | 11/1984 | Smith | 428/35 |

*Primary Examiner*—John C. Bleutge
*Assistant Examiner*—Patricia Short
*Attorney, Agent, or Firm*—Donald W. Spurrell; J. Frederick Thomsen

[57] ABSTRACT

Disclosed are polyester blends and articles produced therefrom, wherein the blends contain copolyester material comprising one or a mixture of copolyesters such as that prepared from ethylene glycol and 1,4-cyclohexanedimethanol in certain molar proportions with terephthalic acid, blended in certain proportions with poly(ethylene isophthalate). Formed amorphous articles such as bottles, films and sheets of these blends unexpectedly are clear and show marked reduction in carbon dioxide permeability, e.g., about 20–40% lower than predicted, and have good oxygen and water vapor barrier properties. The blends are especially useful in food packaging applications such as carbonated drink bottles, where good gas and water vapor barrier properties are highly desirable.

6 Claims, 2 Drawing Figures

EFFECT OF POLY(ETHYLENE ISOPHTHALATE) CONCENTRATION ON THE $CO_2$ PERMEABILITY OF POLY [(69) ETHYLENE-CO-(31) 1,4-CYCLOHEXYLENEDIMETHYLENE TEREPHTHALATE]

EFFECT OF POLY(ETHLENE ISOPHTHALATE) CONCENTRATION ON THE $O_2$ PERMEABILITY OF POLY[(69)ETHYLENE-CO-(31)1,4-CYCLOHEXYLENEDIMETHYLENE TEREPHTHALATE]

COPOLYESTER/POLYESTER BLENDS HAVING REDUCED CARBON DIOXIDE PERMEABILITY

This is a continuation-in-part application of Ser. No. 519,475, filed Aug. 1, 1983, now abandoned.

This invention concerns polyester blends and articles produced therefrom, wherein the blends contain copolyester material comprising one or a mixture of copolyesters such as that prepared from ethylene glycol and 1, 4-cyclohexanedimethanol in certain molar proportions with terephthalic acid, blended in certain proportions with poly(ethylene isophthalate). Formed amorphous articles such as bottles, films and sheets of these blends unexpectedly are clear and show marked reduction in carbon dioxide permeability, e.g., about 20-40% lower than predicted, and have good oxygen and water vapor barrier properties. The blends are especially useful in food packaging applications such as carbonated drink bottles, where good gas and water vapor barrier properties are highly desirable.

The copolyesters and poly(ethylene isophthalate) (PEI) herein each have inherent viscosities prior to blending from about 0.4 to about 1.0, preferably from about 0.55 to about 0.85. The blends contain from about 5 to about 60% by weight of PEI, preferably from about 20 to about 40% by weight.

The copolyesters are prepared from (1) an acid component comprising from about 70 to 100 mole % terephthalic acid (TPA), and up to about 30 mole % of one or a mixture of isophthalic acid (IPA), 2,6-naphthalenedicarboxylic acid (NDA), and 1,4-cyclohexanedicarboxylic acid (CHDA), and (2) a glycol component comprising from about 50 to about 80 mole % ethylene glycol, from about 20 to about 50 mole % 1,4-cyclohexanedimethanol, up to about 5 mole % diethylene glycol, and up to about 15 mole % of one or a mixture of modifying diols such as the $C_3$-$C_{12}$ aliphatics, the cycloaliphatics and aromatics, and includes 1,3-propanediol, 1,2-propylene glycol, 2,4-dimethyl-2-ethylhexane-1,3-diol, 2,2,4-trimethyl-1,3-pentanediol, 2,2-dimethyl-1,3-propanediol, 2-ethyl-2-butyl-1,3-propanediol, 2,2-diethyl-1,3-propanediol, 2-methyl-2-propyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, 1,2cyclohexanedimethanol, 1,3-cyclohexanedimethanol, 2,2,4,4-tetramethyl-1,3-cyclobutanediol, o-, m-, and p-xylylene diols, 4,4'-sulfonyldiphenol, 4,4'-oxydiphenol, 4,4'-isopropylidenediphenol, and 2,7- and 2,5-naphthalenediol. Many other modifying diols are known to the art and are useful herein.

The copolyesters and poly(ethylene isophthalate) can be produced according to conventional processes, e.g., involving esterification or transesterification with a catalyst such as titanium tetraisopropoxide, with or without the introduction of an inert gas stream, as solution condensation in a solvent, or as a melt condensation, at temperatures of up to about 250° C., or higher such that the water or alkanol produced is continuously removed. The esterification takes place almost quantitatively and can be followed by measuring the hydroxyl and acid numbers. The reaction temperature may be selected so that the losses of volatile substances remain small during at least the early stages of the esterification, for example, by carrying out the esterification at a temperature below the boiling point of the lowest boiling starting material. The prepolymer or monomer obtained by the esterification, conventionally recognized as bis(hydroxyethylterephthalate) and oligomers thereof, is then polycondensed at higher temperatures, e.g., up to about 290° C. until the desired I.V. is obtained. The term "acid" as used herein, e.g., terephthalic acid (TPA), includes the condensable derivatives of the acids such as their esters and acid chlorides, particularly dimethylterephthalate.

A typical polyester preparation is as follows:
145.5 grams (0.75 mole) dimethylterephthalate,
89.0 grams (1.44 moles) ethylene glycol,
32.8 grams (0.23 mole) 1,4-cyclohexanedimethanol, and
120.0 ppm Ti as titanium tetraisopropoxide,
are added to a 500-ml. round-bottom flask fitted with a stirrer, condensate take-off, and nitrogen inlet head. The flask and contents are immersed in a Woods metal bath at approximately 170° C. and the temperature raised to 195° C. and maintained for two hours and twenty minutes to complete ester exchange and esterification of the dimethylterephthalate, ethylene glycol, and 1,4-cyclohexanedimethanol. During this ester exchange and esterification, a nitrogen purge of approximately two cubic feet/hour is maintained over the reaction system. The temperature is then raised to 285° C., the melt placed under 0.10 mm. vacuum, and polycondensation continued for 50 minutes. The resulting polymer has an inherent viscosity of about 0.739.

The inherent viscosities (I.V.) of each of the copolyesters and the poly(ethylene isophthalate) herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)_{0.50\%}^{25°\ C.} = \frac{\ln \frac{t_s}{t_o}}{C}$$

where:
[$\eta$]=Inherent viscosity at 25° C. at a polymer concentration of 0.5 g./100 ml. of solvent;
ln=Natural logarithm;
$t_s$=Sample flow time;
$t_o$=Solvent-blank flow time; and
C=Concentration of polymer in grams per 100 ml. of solvent =0.50.

The I.V. values given herein are in deciliters/gram.

The present invention is defined as a polyester blend, particularly useful in film or sheet form having greatly reduced carbon dioxide permeability, said blend being formed by admixing under essentially non-transesterification conditions and in the absence of any transesterification catalyst (a) from about 40 to about 95% by weight of one or a mixture of copolyesters having an I.V. of from about 0.4 to about 1.0 prepared from (1) an acid component comprising from about 70 to 100 mole % terephthalic acid and up to about 30 mole % of one or a mixture of isophthalic acid, 2,6-naphthalenedicarboxylic acid, and 1,4-cyclohexanedicarboxylic acid, and (2) a glycol component comprising from about 50 to about 80 mole % ethylene glycol, from about 20 to about 50 mole % 1,4-cyclohexanedimethanol, up to about 5 mole % diethylene glycol, and up to about 15 mole % of one or a mixture of modifying diols, and (b) from about 5 to about 60% by weight of poly(ethylene isophthalate) having an I.V. of from about 0.4 to about 1.0.

In preferred embodiments of the invention, the said acid component is terephthalic, and the glycol component is from about 60 to about 75 mole % ethylene glycol, from about 25 to about 40 mole % 1,4-cyclohexanedimethanol, up to about 5.0 mole % diethylene glycol, and up to about 10 mole % of one or a mixture of modifying diols selected from 1,4-butanediol, neopentyl glycol, 2,2,4-trimethyl-1,3-pentanediol, 1,6-hexanediol, and 1,3-propanediol.

The present blends are prepared, for example, by mixing the copolyesters and PEI in conventional melt blending equipment such as compounding extruders or Banbury mixers. Film or sheet material may be formed, e.g., directly from the melt blend or from preformed pellets. If desired, conventional additives such as dyes, pigments, stabilizers, plasticizers, fillers, and the like, may be added to the compositions in typical amounts.

It is required that the copolyesters used be compatible with poly(ethylene isophthalate), that is, the melt blend gives clear films on extrusion and exhibits a single glass transition temperature ($T_g$) intermediate those of the components when analyzed with a differential scanning calorimeter (Table 1).

This invention and its unobviousness will be further demonstrated by the following examples although it will be understood that these examples are included merely for purposes of illustration and are not intended to limit the scope of the invention.

BRIEF DESCRIPTION OF THE DRAWINGS

The relationship for predicting the gas permeability in two component blends of completly miscible polymers has been reported in the J. of Polymer Sci., 36, 21 (1959) by S. W. Lasoski and W. H. Cobbs. Since the present blends are clear and exhibit a single glass transition temperature, it is concluded that the present blends are completely miscible and the gas permeability of the two component blends should vary between the permeabilities of the pure components according to the relationship $$\log P_O = X_1 \log P_1 + X_2 \log P_2$$

where $P_O$, $P_1$, and $P_2$ are the permeabilities of the blend and the pure components, thereof, i.e., copolyester and PEI, respectively, and $X_1$ and $X_2$ are the weight fractions of the copolyester and PEI in the blend. When plotted as log $P_O$ versus increasing weight fraction ($X_2$) of PEI in the blend, the predicted permeability decreases linearly as shown by the dotted lines in FIGS. 1 and 2.

Figure 1:
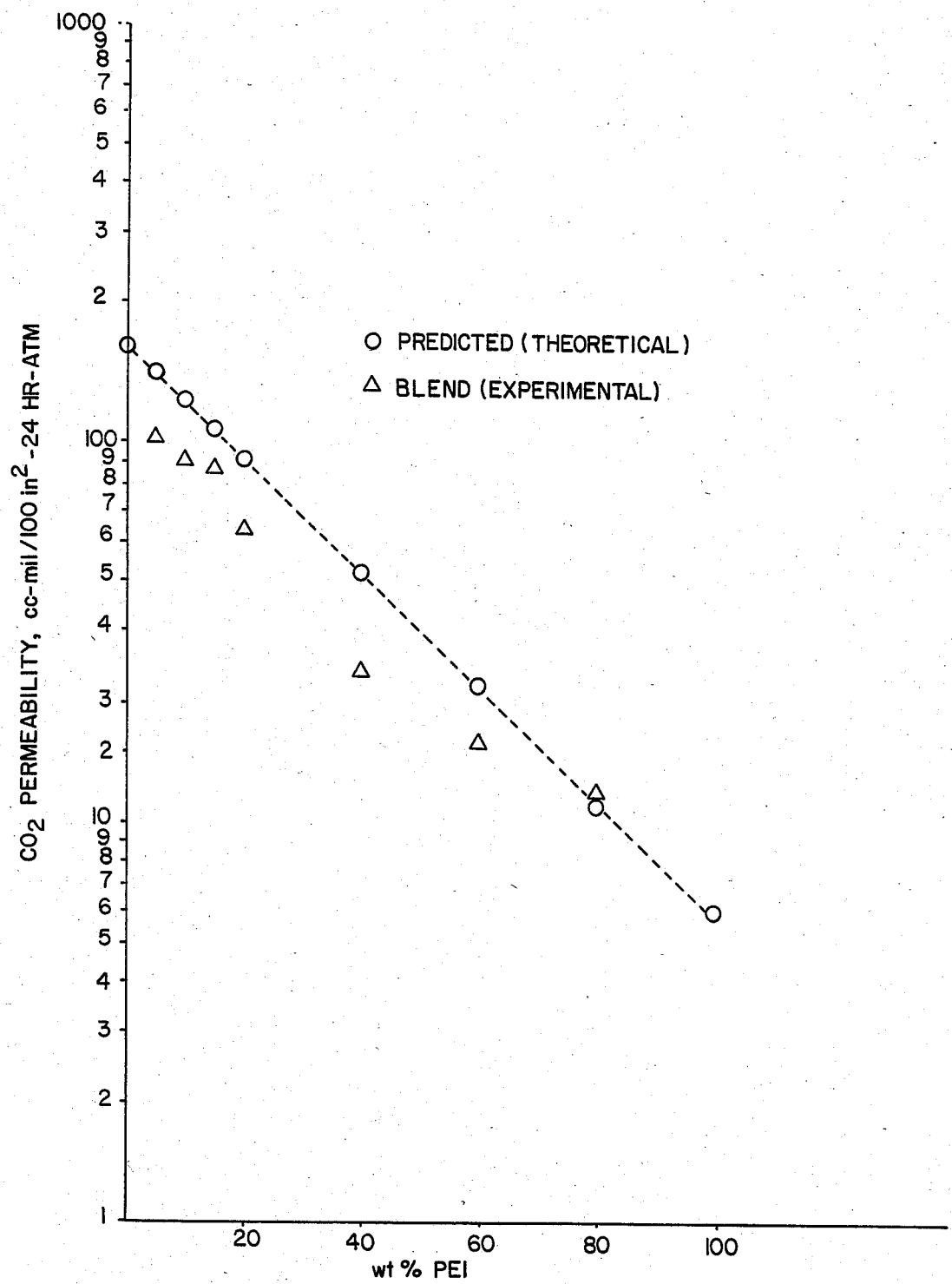
Figure 2:
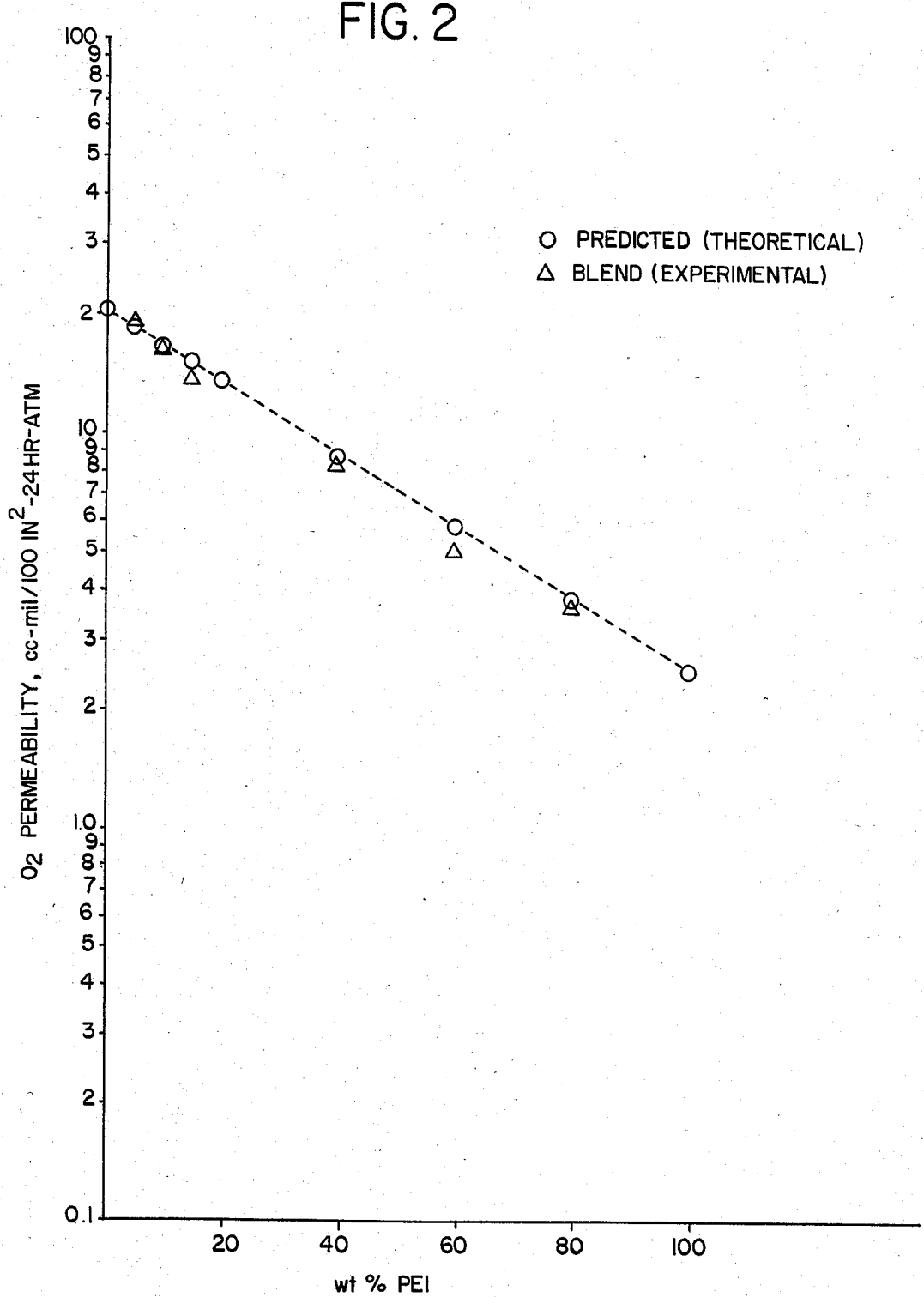

Referring to Table 1 and FIGS. 1 and 2, blends of the copolyester consisting of poly(ethylene terephthalate) modified with 31 mole % 1,4-cyclohexanedimethanol (PETG) having an I.V. of 0.75, were prepared by dry mixing pellets of the copolyester with PEI of 0.75 I.V. and extruding the mixtures into films 2 to 3 mils thick. The carbon dioxide and oxygen permeabilities were recorded in Table 1 and are plotted in FIGS. 1 and 2, respectively. It was found that the $CO_2$ permeability of blends of PETG with from about 5 wt. % to about 60 wt. % PEI was on the average about 30% lower than predicted (FIG. 1). This was totally unexpected since the $O_2$ permeability can easily be predicted by the Lasoski and Cobbs equation (FIG. 2). At about 80 wt. % PEI the $CO_2$ permeability was found to be close to the predicted value.

The oxygen permeability is calculated in cubic centimeters of $O_2$ permeating a 1-mil thick sample, per 100 inches square, over a 24-hour period under an $O_2$ partial pressure difference of one atmosphere at 30° C. using a MoCoN OX-TRAN 10-50 instrument and is reported as cc-mil/100 in$^2$-24 hours-atm. Carbon dioxide permeability is determined and reported in the same manner but on a MoCoN PERMATRAN-C instrument. These instruments and detailed instruction manuals for their use are supplied to the industry by Modern Controls, Inc., of Minneapolis, Minn. The film actually used to measure permeability varies between about 3 to 8-mils in thickness, and the permeability is converted to a 1 mil basis in known manner. The compositions used in the examples are compounded by extrusion and extruded into film using a Brabender extruder at 240°-270° C.

TABLE 1

| Wt. % PEI | $O_2$ Permeability cc-mil/100 in$^2$ 24 hr-atm | $CO_2$ Permeability cc-mil/100 in$^2$ 24 hr-atm |
|---|---|---|
| None | 20.5 | 156.3 |
| 5 | 18.8 | 91.0 |
| 10 | 16.3 | 80.5 |
| 15 | 13.6 | 77.3 |
| 20 | 13.9 | 54.4 |
| 40 | 8.2 | 24.1 |
| 60 | 5.0 | 16.1 |
| 80 | 3.6 | 12.2 |

The invention has been described in detail with particular reference to preferred embodiments thereof, but it will be understood that variations and modifications can be effected within the spirit and scope of the invention.

We claim:

1. A polyester blend, particularly useful in film or sheet form having greatly reduced carbon dioxide permeability, said blend being formed by admixing under essentially non-transesterification conditions and in the absence of any transesterification catalyst (a) from about 40 to about 95% by weight of one or a mixture of copolyesters having an I.V. of from about 0.4 to about 1.0 prepared from (1) an acid component comprising from about 70 to 100 mole % terephthalic acid and up to about 30 mole % of one or a mixture of isophthalic acid, 2,6-naphthalenedicarboxylic acid, and 1,4-cyclohexanedicarboxylic acid, and (2) a glycol component comprising from about 50 to about 80 mole % ethylene glycol, from about 20 to about 50 mole % 1,4-cyclohexanedimethanol, up to about 5 mole % diethylene glycol, and up to about 15 mole % of one or a mixture of modifying diols, and (b) from about 5 to about 60% by weight of poly(ethylene isophthalate) having an I.V. of from about 0.4 to about 1.0.

2. The blend of claim 1 wherein the said acid component is terephthalic, and the glycol component is from about 60 to about 75 mole % ethylene glycol, from about 25 to about 40 mole % 1,4-cyclohexanedimethanol, up to about 5.0 mole % diethylene glycol, and up to about 10 mole % of one or a mixture of modifying diols selected from 1,4-butanediol, neopentyl glycol, 2,2,4-trimethyl-1,3-pentanediol, 1,6-hexanediol, and 1,3-propanediol.

3. The blend of claim 2 wherein the copolyesters and poly(ethylene isophthalate) each have an I.V. of from about 0.55 to about 0.85.

4. The blend of claim 3 wherein the copolyester consists of terephthalic acid, and a glycol component comprising about 67-70 mole % ethylene glycol, about 30-33 mole % 1,4-cyclohexanedimethanol, and up to about 3 mole % diethylene glycol.

5. An article formed from the blend of any of claims 1-4.

6. A film of from about 1 to about 20 mils in thickness of the blend of any of claims 1-4.

* * * * *